United States Patent
Hudzia et al.

(10) Patent No.: US 9,223,638 B2
(45) Date of Patent: Dec. 29, 2015

(54) LOCKLESS SPIN BUFFER

(71) Applicant: SAP AG, Walldorf (DE)

(72) Inventors: Benoit Hudzia, Belfast (GB); Jonathan Stewart, Belfast (GB); Jonathan Sinclair, Belfast (GB); Jean-Noel Gonzalez de Linares, Versailles (FR)

(73) Assignee: SAP SE, Walldorf (DE)

( * ) Notice: Subject to any disclaimer, the term of this patent is extended or adjusted under 35 U.S.C. 154(b) by 124 days.

(21) Appl. No.: 13/625,613

(22) Filed: Sep. 24, 2012

(65) Prior Publication Data

US 2014/0089539 A1    Mar. 27, 2014

(51) Int. Cl.
| | |
|---|---|
| G06F 13/00 | (2006.01) |
| G06F 9/52 | (2006.01) |
| G06F 9/54 | (2006.01) |
| G06F 9/50 | (2006.01) |

(52) U.S. Cl.
CPC ........ G06F 9/52 (2013.01); G06F 9/544 (2013.01); G06F 9/5016 (2013.01)

(58) Field of Classification Search
CPC .......... G06F 9/544; G06F 9/52; G06F 9/5016
USPC ........................................................ 711/110
See application file for complete search history.

(56) References Cited

U.S. PATENT DOCUMENTS

| | | | |
|---|---|---|---|
| 5,948,082 A | 9/1999 | Ichikawa | |
| 6,802,066 B1 | 10/2004 | Carden, IV et al. | |
| 6,862,635 B1 * | 3/2005 | Alverson et al. | 710/52 |
| 7,802,071 B2 * | 9/2010 | Oved | 711/170 |
| 8,543,743 B2 * | 9/2013 | Eilebrecht | 710/52 |
| 2005/0021898 A1 * | 1/2005 | Alverson et al. | 711/1 |
| 2006/0031839 A1 * | 2/2006 | Kang | 718/102 |
| 2013/0198480 A1 * | 8/2013 | Jones et al. | 711/170 |

OTHER PUBLICATIONS

T.L. Harris et al., "A practical multi-word compare-and-swap operation," In Proceedings of the 16th International Symposium on Distributed Computing, Springer-Verlag, 2002, pp. 265-279.
P. Hirematada, "Spin buffers," Jun. 8, 2007, retrieved online at: http://www.drdobbs.com/architecture-and-design/spin-buffers/199902669, 2 pages.

* cited by examiner

*Primary Examiner* — Ernest Unelus
(74) *Attorney, Agent, or Firm* — Fish & Richardson P.C.

(57) ABSTRACT

Implementations of the present disclosure are directed to enabling data transfer between data producers and data consumers. Implementations include generating a data structure, the data structure including a lockless spin buffer (LLSB), the LLSB including two or more lockless components, each of the two or more lockless components including a plurality of elements to be written to and read from, providing one or more write pointers to enable one or more data producers to write to each of the two or more lockless components, and providing one or more read pointers to enable one or more data consumers to read from each of the two or more lockless components, the one or more data producers being able to write to the LLSB concurrently with the one or more data consumers being able to read from the LLSB.

19 Claims, 4 Drawing Sheets

LOCKLESS SPIN BUFFER

BACKGROUND

Achieving high performance for communications between concurrent applications on modern multiprocessors remains challenging. For example, when two programs, applications, computers, threads, etc. are exchanging data the "producer" of the data puts the data into a sending area (e.g., send buffer), and the "consumer" receives the data within a receiving area (e.g., a receive buffer). However, performance of producer-consumer patterns tends to be limited due to the synchronization mechanism that is required to guaranty the correct utilization of a remote buffer or a shared buffer. In order to mitigate such issues, many programmers try to avoid locking to improve performance, while others replace locks with non-blocking synchronization.

SUMMARY

Implementations of the present disclosure include methods for enabling data transfer between data producers and data consumers. In some implementations, methods include actions of generating a data structure, the data structure including a lockless spin buffer (LLSB), the LLSB including two or more lockless components, each of the two or more lockless components including a plurality of elements to be written to and read from, providing one or more write pointers to enable one or more data producers to write to each of the two or more lockless components, and providing one or more read pointers to enable one or more data consumers to read from each of the two or more lockless components, the one or more data producers being able to write to the LLSB concurrently with the one or more data consumers being able to read from the LLSB.

In some implementations, the two or more lockless components each include a lockless circular buffer (LLCB).

In some implementations, each LLCB includes a fixed number of elements connected end-to-end.

In some implementations, each LLCB is associated with at least one read pointer and at least one write pointer that provide mutual exclusive read access or write access to the LLCB.

In some implementations, actions further include performing a spin operation to cycle through the two or more lockless components of the LLSB.

In some implementations, the spin operation includes: determining that there is no element to be read from a first lockless component that a read pointer of a data consumer is pointing to, and in response, performing a first move operation to move the read pointer to a second lockless component, the second lockless component being the next available lockless component of the LLSB.

In some implementations, actions further include, during the first move operation, performing a second move operation to move a write pointer to one of the first lockless component and a third lockless component.

In some implementations, actions further include, during the spin operation, counting a number of cycles.

In some implementations, actions further include: determining that the number of cycles is equal to a threshold number of cycles, and in response, entering a data consumer into a sleep state during which the spin operation is halted, the data consumer attempting to read data from the LLSB during the spin operation.

In some implementations, actions further include: determining that a write operation has been initiated by a data producer, and in response, awakening the data consumer from the sleep state and re-commencing the spin operation.

In some implementations, the spin operation includes moving a read pointer associated with a data consumer through the two or more lockless components of the LLSB.

In some implementations, the spin operation is performed using one or more atomic operations, the atomic operations including one or more of an atomic increment operation, an atomic decrement operation and a compare-and-swap (CAS) operation.

In some implementations, actions further include dynamically adapting the LLSB based on available resources.

In some implementations, dynamically adapting the LLSB includes reducing a number of lockless components provided in the LLSB.

In some implementations, dynamically adapting the LLSB includes increasing a number of lockless components provided in the LLSB.

In some implementations, dynamically adapting the LLSB includes reducing a number of elements within one or more lockless components.

In some implementations, dynamically adapting the LLSB includes increasing a number of elements within one or more lockless components.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to lockless spin buffers (LLSBs). More particularly, implementations of the present disclosure are directed to a LLSB that maximizes a data transfer rate and minimizes latency while providing a lockless buffer system between a data producer and a data consumer. In some implementations, the LLSB includes a plurality of lockless circular buffers (LLCBs).

In some implementations, each LLCB is provided as a circular buffer. In some examples, the circular buffer is a data structure that uses a single, fixed-size buffer (e.g., a fixed number of elements) as if it were connected end-to-end. In some examples, a circular buffer includes a read pointer and a write pointer that guarantees mutual exclusive read access or write access. In this manner, out-of-order access, multiplicity and skipping can be provided, synchronization between the data producer and the data consumer is required for acquiring and releasing each memory location in the circular buffer as well as for posted writes. In some examples, communication using a circular buffer and synchronization includes a sequence of acquired memory locations. In some examples, each iteration of a nested loop execution conditionally acquires and releases one or more consecutive memory locations. This can result in sliding read and write windows.

In some examples, a circular buffer can be transformed to become lockless (e.g., to be provided as a LLCB). In some examples, lock-freedom enables individual execution threads to starve, but guarantees system-wide throughput. In some examples, an algorithm is lock-free, if it satisfies the condition that at least one thread makes progress (for some sensible definition of progress) when multiple program threads are run for a sufficiently long period of time. In some examples, all wait-free algorithms are lock-free. In some examples, a lock-free circular buffer algorithm involves the data producer placing data into one end of an array, while the data consumer removes data from the other end of the array. When the end of the array is reached, the producer wraps back around to the beginning. Consequently, a circular buffer can require an array and two index values to track where the next new value goes and which value should be removed from the circular buffer next.

Figure 1:
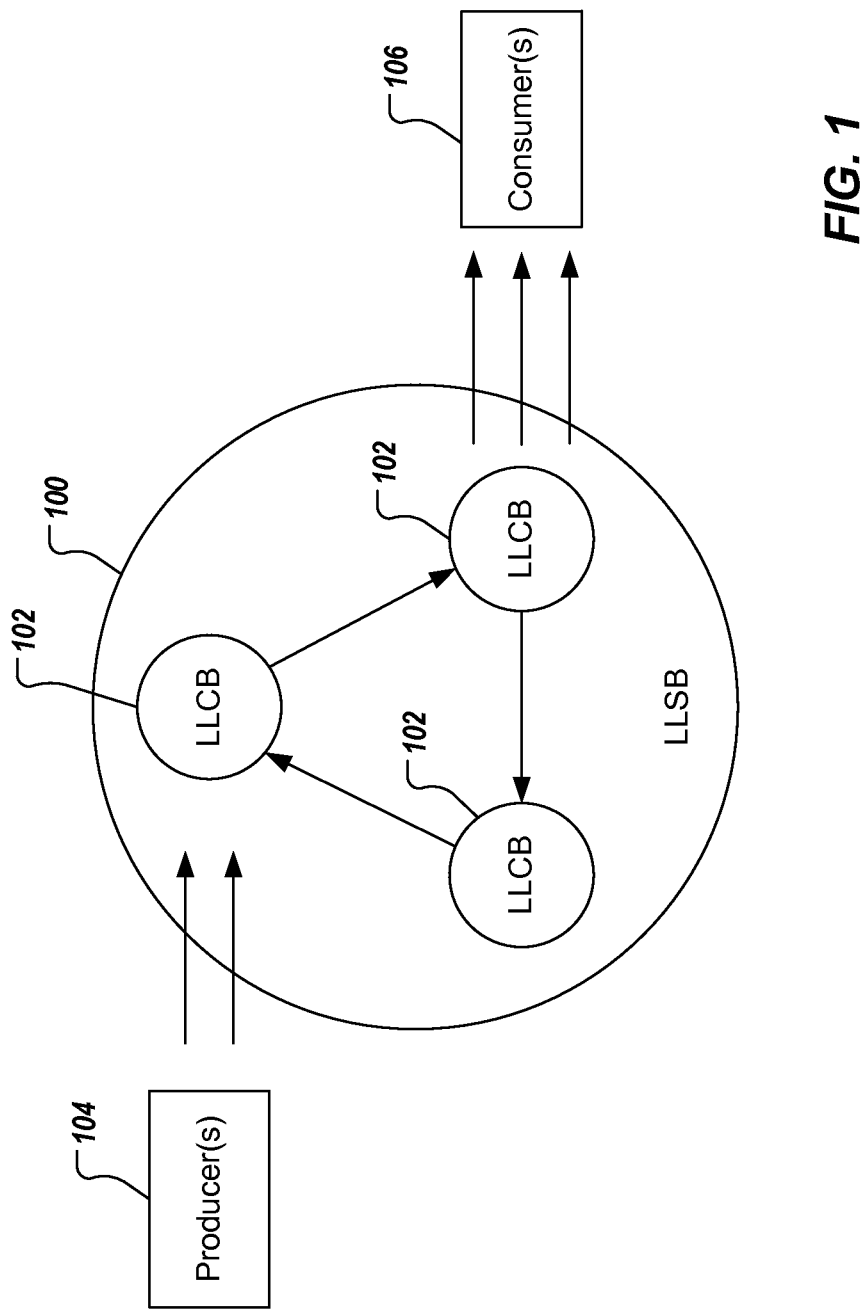
FIG. 1 depicts an example lockless spin buffer (LLSB) in accordance with implementations of the present disclosure.

FIG. 1 depicts an example LLSB 100 in accordance with implementations of the present disclosure. The LLSB 100 includes a plurality of lock-less components. In the depicted example, the plurality of lock-less components includes a plurality of LLCBs 102. Although the example LLSB 100 includes three LLCBs 102, it is appreciated that implementations can include two or more LLCBs 102. Further, and although LLCBs are depicted and discussed herein, it is appreciated that implementations of the LLSB of the present disclosure can include other types of lock-less components. For example, the LLSB of the present disclosure can include lock-less linked lists or lock-less linked stacks as lock-less components.

In some examples, each LLCB 102 is sized to match the optimal payload that the medium can transport. For example, if the LLSB 100 is used for in-memory data exchange, the LLCB size can be a multiple of the size of the largest message that is to be exchanged. Each LLCB 102 acts as a buffer to maximize the efficiency of the transport medium by reducing the amount of overhead introduced by communications protocol. Each LLCB 102 includes a read pointer and a write pointer, and is held within a data structure. The data structure manages each LLCB 102 as a single entry within the LLSB 100. Consequently, the LLSB 100 can be referred to as a circular buffer of circular buffers.

Because the LLSB 100 is lockless, one or more data producers 104 (writers) and one or more data consumers 106 (readers) can operate at each level of the data structure. In this manner, for example, a producer 104 can write to one or more LLCBs 102 at the same time, and/or one or more consumers 106 can read data at the same time. In some implementations, an exclusivity area can be maintained between producers 104 and writers 106. In some examples, exclusivity can be achieved by guaranteeing that only one type of operation occurs on each LLCB 102 at a time. For example, if a LLCB 102 is full (e.g., all slots are written or are being written to) a producer 104 can be authorized to write to the next LLCB 102, if all read operations are terminated and there is no more unread data within the next LLCB 102. As another example, a consumer 106 can be prohibited from reading within a LLCB 102, if one or more write operations are pending for the LLCB 102.

In some implementations, a state of the LLSB 100 is maintained based on maintaining one or more sub-states. Example sub-states can include the state of individual LLCBs 102 within each LLSB 100 (e.g., full, contains elements). In some examples, only one write pointer is provided for a current write LLCB. The write pointer tracks where the next free element for writing data to will come from. In some examples, only one write pointer is provided for a previous write LLCB. Based on the write pointer of the previous LLCB, it can be determined whether the previous LLCB is still being written to. In this manner, for example, asynchronous release of and LLCB can be provided to enable the use of more than one LLCB while providing asynchronous transfer. In some examples, only one read pointer is provided for the current read LLCB. The read pointer tracks the written element that is to be read from. In some examples, only one read pointer is provided for the previous read (LLCB). In this manner, the last LLCB, which can still be being used for reading can be tracked. In some examples, a writer counter is provided. The write counter indicates the number of threads that are currently performing respective write operations. In some examples, a reader counter is provided. The read counter indicates the number of threads that are currently performing respective read operations. In some examples, a usage count is maintained for each LLCB, whether being written to or read from. For example, the usage count can indicate the number of elements of a particular LLCB that are currently being used by a producer or a consumer. In this manner, premature release of a LLCB can be prevented, while the LLCB is still been used.

In some implementations, a pointer to a LLCB can have an alternate state (e.g., containing the ID of the LLCB). In some examples, the pointer can include a read pointer or a write pointer. In some examples, the pointer can be provided as "buffer ID" (pointing to a LLCB), "out of bound" (pointing to nothing), "move next" (signaling movement to the next LLCB), or "spinning" (signaling, for example, that a critical section of code is being executed by one thread and the thread is to be left to spin until execution of the code is completed).

As discussed in further detail herein, implementations of the present disclosure use atomic operations. In some examples, an atomic operation can be realized as a sequence of one or more machine instructions that are executed sequentially (e.g., by a processor, a thread), without interruption. In some examples, atomic operations have a succeed-or-fail definition such that they either successfully change the state of a system or have no apparent effect. That is, an atomic operation can include an operation that is either performed entirely or not performed at all. In some examples, during an atomic operation, a processor can simultaneously read a memory location and write to the memory location in the same bus operation. In this manner, any other processor or I/O device is prevented from writing or reading memory until the operation is complete.

Example atomic operations can include atomic increment, atomic decrement, and a compare-and-swap instruction ("CAS"). In some examples, the CAS can be referred to as the compare-and-exchange instruction (e.g., CMPXCHG instruction in x86 and Itanium architectures). In some examples, atomic increment increments an integer value and atomic decrement decrements an integer value. In some examples, the CAS atomically compares the content of a memory location to a given value and, only if they are the same, modifies the content of that memory location to a given new value. This guarantees that the new value is calculated based on up-to-date information. For example, if the value had been updated by another thread in the meantime, the write would fail. In some examples, the result of the CAS indicates whether the CAS performed the substitution (e.g., using a Boolean response ("compare-and-set"), or returning the value read from the memory location (not the value written to the memory location)).

Figure 2:
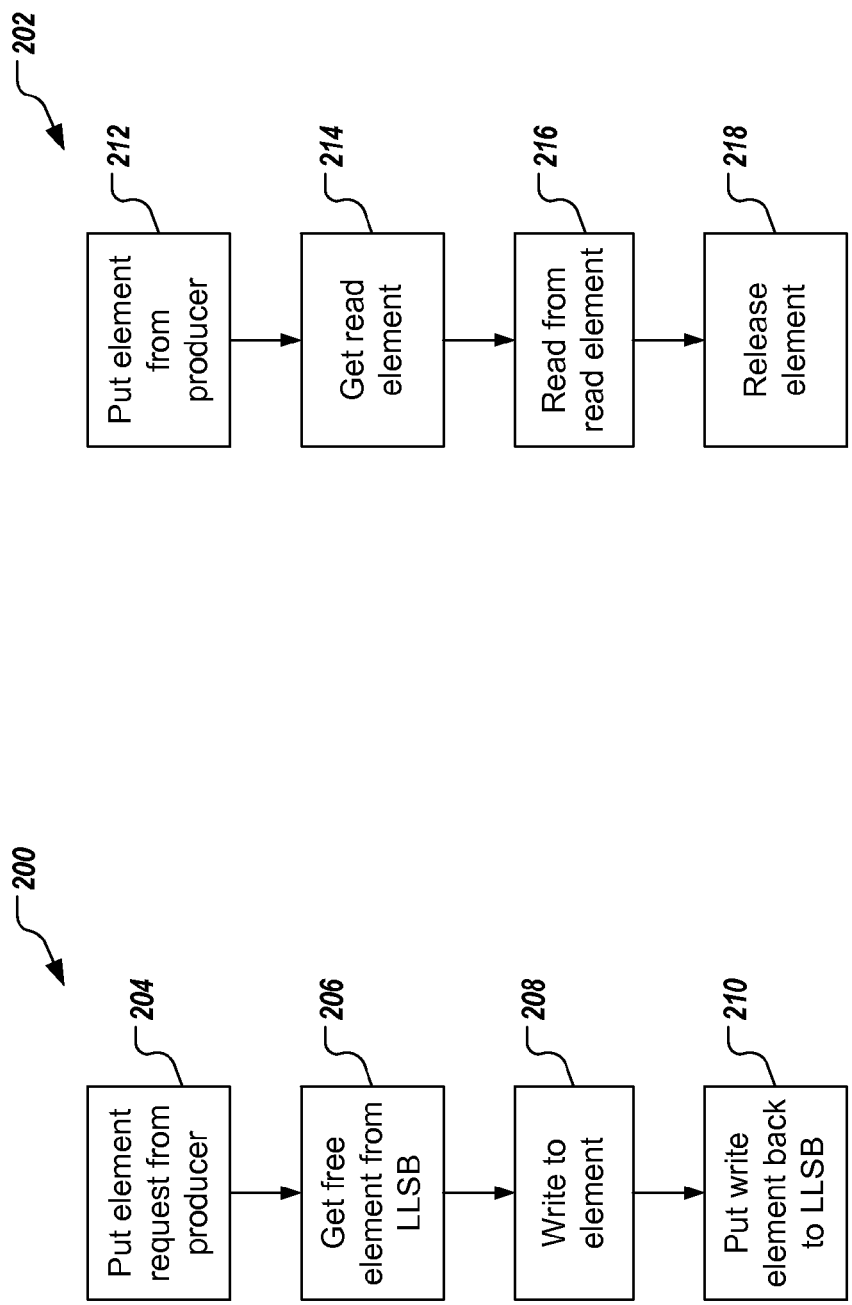
FIG. 2A depicts an example process for writing data to a LLSB.
FIG. 2B depicts an example process for reading data from a LLSB.

Referring now to FIGS. 2A and 2B, overall operation of a LLSB in accordance with implementations of the present disclosure will be discussed. FIG. 2A depicts an example process 200 for writing data to a LLSB. FIG. 2B depicts an example process 202 for reading data from a LLSB. In some examples, each of the example processes 200, 202 can be provided as one or more computer-executable programs executed using one or more processing devices.

With particular reference to FIG. 2A, the example process 200 provides example operations provided by a LLSB. In some examples, the operations are exposed through a programmatic interface. The example process 200 demonstrates a data write performed by a data producer. A put element request is received from the data producer (204). A free element is retrieved for a LLCB of the LLSB (206). Data is written to the free element to provide a write element (208). The write element is provided back to the LLCB of the LLSB (210).

With particular reference to FIG. 2B, the example process 202 provides example operations provided by a LLSB. In some examples, the operations are exposed through a programmatic interface. The example process 202 demonstrates a data read performed by a data consumer. A write element is put into the LLSB (released to be read) by the data producer (212). The write element is then available to be read from, as a read element, by a data consumer. A read element is retrieved for a LLCB of the LLSB (214). Data is read from the read element to provide a free element (216). The free element is provided back to the LLCB of the LLSB (218).

In some implementations, the LLSB of the present disclosure can be dynamically adapted to match available resources (e.g., network, CPU, memory, etc.). In some examples, adaptation methods can vary. An example adaptation method can include enabling the LLSB to either vary the LLCB sizes and/or to vary the number of LLCBs provided within the LLSB. In some examples, dynamically adapting the LLSB can include a temporary pause in communications (e.g., between producer and consumer), while the change(s) is (are) being made.

Implementations of the present disclosure further enable a "spin-down" of the LLSB. In some examples, the data consumer side will try to read from the LLSB. If there is no element to be read from the current LLCB, the spin buffer will try to move to the next available LLCB. During the move operation, the LLSB will also try to move the write pointer to the next LLCB. In this manner, it is guaranteed that any write element contained in a LLCB will be made available for the data consumer. In some examples, if the LLSB contains more than two LLCBs, a move to the next available LLCB is performed to read from the next available LLCB until the complete set of LLCBs is spun through a threshold number of times. In some examples, after achieving the threshold number of cycles and, an element to be read by the data consumer is still not found, the data consumers enter a quiescent state (sleep state). As soon as a data producer writes to a LLCB, the data consumers awaken and re-start the read/spinning cycles.

In some implementations, a spin counter can be used to determine the number of cycles that have been performed. In some examples, the spin counter can be initially set to zero. In some examples, the spin counter can be set to zero in response to a successful read. In some examples, an atomic increment can be performed to increment the spin counter with each cycle.

To briefly summarize the foregoing, a data consumer cycles through the LLSB a threshold number of times (cycles) before entering a sleep state. Cycling through the LLSB guarantees that, with each cycle, the write pointer will be moved to the next available LLCB that is to be written to. After the threshold number of cycles is achieved, the data consumers enter and maintain the sleep state until being woken up in response to occurrence of a write operation from a data producer. In this manner, it is guaranteed that available resource are not over-consumed, while keeping the spinning characteristic of the system.

Implementations of example operations will be described in detail. Example operations include operations performed by a data producer and operations performed by a data consumer. Example data producer operations can include a "get" operation and a "put" operation. In some examples, the get operation can include one or more tasks executed to get free element from a LLCB of an LLSB to be written too. In some examples, a non-blocking variant can be provided, which enables a programmer to try to obtain a free element and retry zero or more times to obtain a free element before abandoning the get operation. This enables the programmer to execute other tasks before retrying, and prevents the program from being blocked while waiting for a free element. In some examples, the put operation can include one or more tasks to release a written element within the LLSB. In some examples, the LLSB can attempt to move the current write pointer to the next LLCB as soon as possible. This can result in the data in the previously used LLCB being made available for writing, for transfer (e.g., if the LLSB is used for networking), or for direct access.

In some implementations, the get operation can include atomic increment, atomic decrement and the CAS operations. In some examples, the get operation can be performed a data producer in an attempt to obtain an LLCB element to write to. In some examples, it can be determined whether to move to the next LLCB. For example, if a current write pointer is in the state "out of bound," a move to the next LLCB can be performed. In some examples, the move to the next LLCB can be delayed (e.g., using exponential back off). In some examples, the move can be delayed until one or more data consumers exit their spin state. After the move, an element to be written to can be attempted to be obtained. If an element to be written to is obtained, the data producer can write data to the element. If an element to be written to is obtained, a move is attempted to the next LLCB (restart the operation). In some examples, each attempt to write to a LLCB results in incrementing a counter that tracks the number of writers (data producers) using the LLCBs. In some examples, the counter is decremented after a data producer completes its write operation.

In some implementations, if a move is not made to the next LLCB and at least one writer (data producer) is performing a write operation, an attempt is made to obtain an element within the current LLCB to write to. In some examples, the state of the LLCB is cleaned up. In some examples, cleaning up the LLCB enables a data consumer to move into the LLCB while preventing an inconsistent state of the LLCB. After clean-up, an attempt is made to acquire a free element within the LLCB. In some examples, waiting is provided (e.g., one or more readers (data consumers) are performing read operations). In some examples, waiting can be provided in the case that the current LLCB that is to be written to is still being used by a data consumer. Once an element is acquired, data is written to the element. In some examples, if an element cannot be acquired, the operation restarts and a move is made to the next LLCB (because the current LLCB is full).

In some implementations, the non-blocking variant of the get operation can include actions described above. In some examples, the non-blocking variant introduces a counter to count the number of attempts that are made to acquire an element to write to. In some examples, if the counter exceeds a threshold, it is determined that the operation fails and further attempts are not made.

In some implementations, the put operation can include the CAS operation. In some implementations, the release of an element after it has been written to triggers example actions. In some examples, an action includes moving a current write pointer to the next LLCB. In some examples, an action includes cleaning up the status of the previous and/or current LLCB, if no writers are performing write operations on the previous and/or current LLCB.

Example data consumer operations can include an "extract" operation and a "release" operation. In some examples, the extract operation includes one or more tasks that enable a data consumer extract an element that has been written too by a data producer. The data consumer can read/manipulate the data read from the element. In some examples, the release operation includes one or more to release the read element within the LLSB. In some examples, upon release the element, the element is treated as a free element, ready to be written to by a data producer. In some examples, a variant can include exiting and returning a non-element rather than waiting (spinning) until an element arrives. In this variant, signal that there is no element available at the time is effectively provided. In some examples, a notification mechanism can be provided to enable asynchronous processing of data.

In some implementations, the get operation can include atomic increment, atomic decrement and the CAS operations. In general, actions are performed to enable a data consumer to obtain a previously written to element to read from it. In some examples, a counter is provided to track the number of readers (data consumers) associated with the current LLCB being read. In some examples, if a reader cannot obtain an element from the current LLCB to read from (e.g., the current LLCB is empty), the reader attempts to move to the next LLCB, if the next LLCB is free (e.g., no write operations are occurring to the next LLCB). In some examples, the reader can only move to the next LLCB, if all read operations (e.g., other read operations being performed by other data consumers) in the current LLCB are terminated. In some examples, the read operation will loop until it is terminated or another thread is moved to a new LLCB with an available element. If a previous read pointer is moved to point to the current LLCB, the reader will loop and try to move the current read pointer to the next LLCB, if no write operations are occurring. In some examples, write pointers can be nudged, if there are no more write operations occurring. In this manner, a cycle is provided. The counter tracks the number of cycles without a read operation to provide the spin down process, thereby eliminating unnecessary CPU resource consumption and operations on empty buffers.

Figure 3:
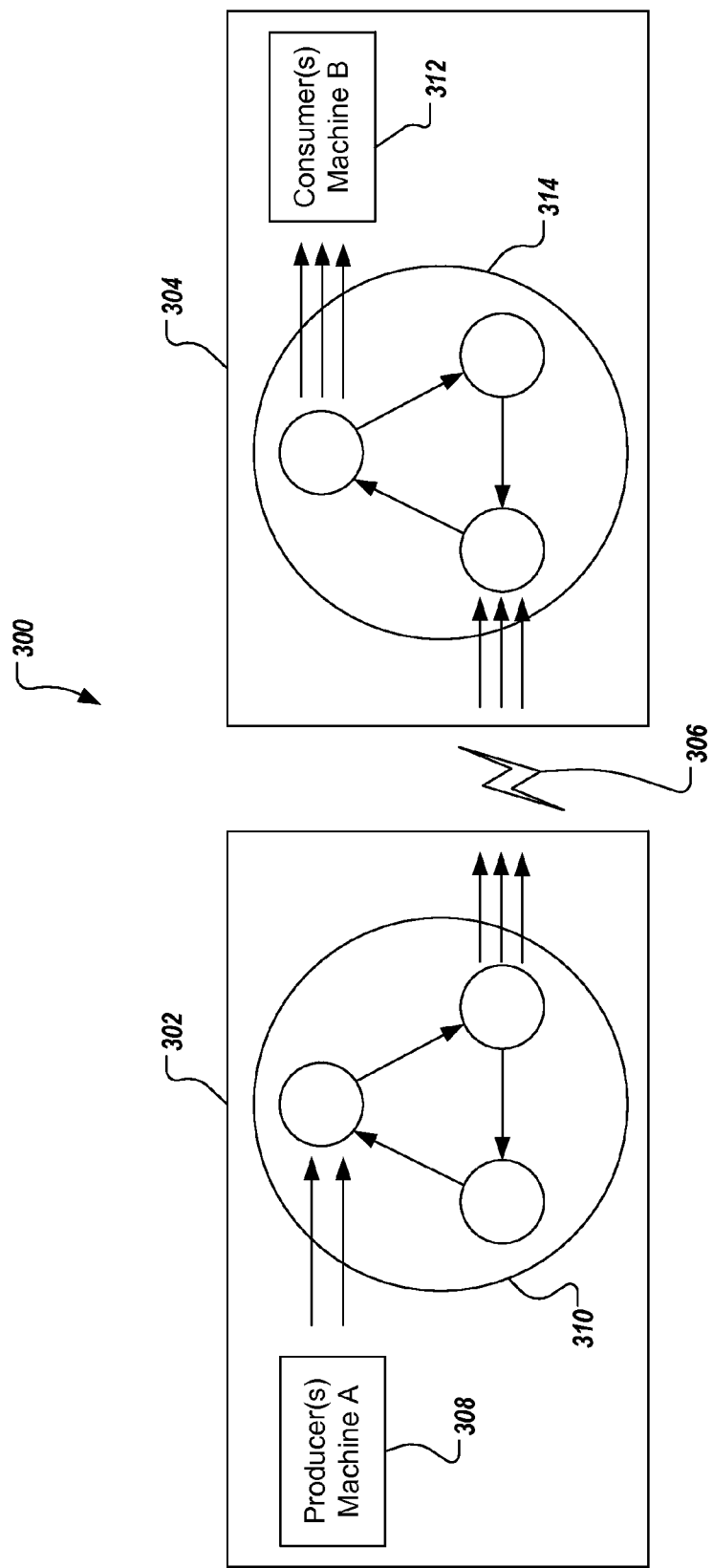
FIG. 3 depicts an example use case.

FIG. 3 depicts an example use case for LLSBs in accordance with implementations of the present disclosure. The example use case includes using LLSBs for network communication. It is appreciated, however, that implementations of the present disclosure are applicable to other use cases.

FIG. 3 depicts a network 300 including a first system 302, a second system 304 and a network 306. The first system 302 includes one or more data producers 308 and a LLSB 310 in accordance with implementations of the present disclosure. The second system 304 includes one or more data consumers 312 and a LLSB 314 in accordance with implementations of the present disclosure. In some implementations, the network 306 can be described as a data consumer with respect to the LLSB 310 of the first system 302. That is, one or more components of the network 306 can read data from the LLSB 310. In some implementations, the network 306 can be described as a data producer with respect to the LLSB 314 of the second system 304. That is, one or more components of the network 306 can write data to the LLSB 314.

In some examples, use of the LLSBs 310, 314 maximizes throughput between network enabled applications (e.g., data producers 308, data consumers 312), while minimizing latency. In some examples, the LLSBs 310, 314 provide a uni-directional communication channel, as depicted in FIG. 3. In some examples, a bi-directional communication channel can be provided using uni-directional channels, or enabling a programmer to use the same LLSB for send and receive at each end of a uni-directional communication channel. In some examples, throughput can be maximized by leveraging a worker pool system to avoid contention at the network level (e.g., at the network interface card (NIC). It is appreciated, however, that implementations can vary depending on the network set-up. In some examples, the throughput can be maximized and the latency can be minimized if each data consumer 312 empties at least one of the internal buffers, because the internal buffers are specifically size to match the transport protocol payload. In this manner, the data producer/data consumer pair that is dedicated for network communication are working at LLCB granularity, rather than buffer element granularity, because the buffers are dimensioned to provide optimal network resource consumption.

Implementations of the present disclosure provide a LLSB as a data structure that is lock-free, that provides concurrency support and that provides linearity in performance. With regard to being lock-free, implementations of the present disclosure avoid lock-based approaches in order to achieve greater scalability benefits on, for example, multiprocessor machines and with parallel communication streams. Implementations provide concurrency support for concurrent updates to shared data structures. That is, implementations enable multiple readers (data consumer) and writers (data producer) to concurrently access the data structure without having to rely on a locking or synchronization mechanism while guaranteeing coherency of the system. With regard to linearity of performance, implementations of the present disclosure maximize throughput while minimizing latency by, for example, optimizing bandwidth usage and avoiding contention through flow control which is derived by the inherent characteristics of the data structure.

Figure 4:
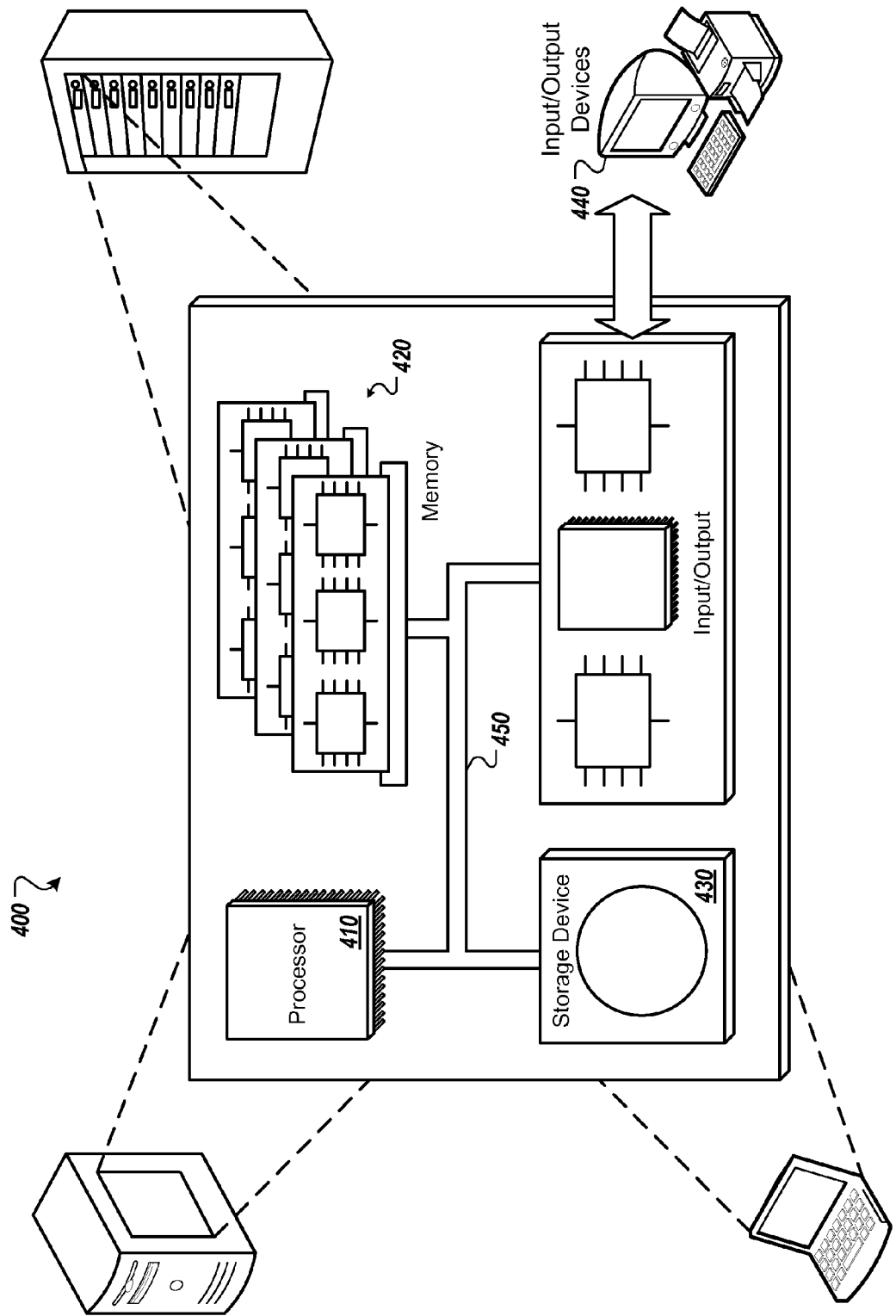
FIG. 4 is a schematic illustration of example computer systems that can be used to execute implementations of the present disclosure.

FIG. 4 is a schematic illustration of example computer systems 400 that can be used to execute implementations of the present disclosure. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 330 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for enabling data transfer between data producers and data consumers, the method being executed by one or more processors and comprising:

generating, by the one or more processors, a data structure, the data structure comprising a lockless spin buffer (LLSB), the LLSB comprising three or more lockless components, each of the three or more lockless components comprising a plurality of elements to be written to and read from, and the three or more lockless components being cycled for write operations and read operations within the LLSB by circularly traversing each of the three or more lockless components such that last lockless component of the three or more lockless components is directly pointing to first lockless component of the three or more lockless components;

providing, by the one or more processors, one or more write pointers to configure two or more data producers to write to the same lockless component;

providing, by the one or more processors, one or more read pointers to configure one or more data consumers to read from each of the three or more lockless components, the two or more data producers being able to write to the LLSB concurrently with the one or more data consumers being able to read from the LLSB; and moving, by the one or more processors and in response to at least one operation that is performed, one or more of a write pointer and a read pointer based on a state of one or more of the three or more lockless components.

2. The method of claim 1, wherein the three or more lockless components each comprise a lockless circular buffer (LLCB).

3. The method of claim 2, wherein each LLCB comprises a fixed number of elements connected end-to-end.

4. The method of claim 2, wherein each LLCB is associated with at least one read pointer and at least one write pointer that provide mutual exclusive read access or write access to the LLCB.

5. The method of claim 1, further comprising performing a spin operation to cycle through the three or more lockless components of the LLSB.

6. The method of claim 5, wherein the spin operation comprises:
determining that there is no element to be read from a first lockless component that a read pointer of a data consumer is pointing to; and
in response, performing a first move operation to move the read pointer to a second lockless component, the second lockless component being the next available lockless component of the LLSB.

7. The method of claim 6, further comprising, during the first move operation, performing a second move operation to move a write pointer to one of the first lockless component and a third lockless component.

8. The method of claim 5, further comprising, during the spin operation, counting a number of cycles.

9. The method of claim 8, further comprising:
determining that the number of cycles is equal to a threshold number of cycles; and
in response, entering a data consumer into a sleep state during which the spin operation is halted, the data consumer attempting to read data from the LLSB during the spin operation.

10. The method of claim 9, further comprising:
determining that a write operation has been initiated by a data producer; and
in response, awakening the data consumer from the sleep state and re-commencing the spin operation.

11. The method of claim 5, wherein the spin operation comprises moving a read pointer associated with a data consumer through the three or more lockless components of the LLSB.

12. The method of claim 5, wherein the spin operation is performed using one or more atomic operations, the atomic operations comprising one or more of an atomic increment operation, an atomic decrement operation and a compare-and-swap (CAS) operation.

13. The method of claim 1, further comprising dynamically adapting the LLSB based on available resources.

14. The method of claim 13, wherein dynamically adapting the LLSB comprises reducing a number of lockless components provided in the LLSB.

15. The method of claim 13, wherein dynamically adapting the LLSB comprises increasing a number of lockless components provided in the LLSB.

16. The method of claim 13, wherein dynamically adapting the LLSB comprises reducing a number of elements within one or more lockless components.

17. The method of claim 13, wherein dynamically adapting the LLSB comprises increasing a number of elements within one or more lockless components.

18. A non-transitory computer-readable medium coupled to one or more processors having instructions stored thereon which, when executed by the one or more processors, cause the one or more processors to perform operations for enabling data transfer between data producers and data consumers, operations comprising:
generating a data structure, the data structure comprising a lockless spin buffer (LLSB), the LLSB comprising three or more lockless components, each of the three or more lockless components comprising a plurality of elements to be written to and read from, and the three or more lockless components being cycled for write operations and read operations within the LLSB by circularly traversing each of the three or more lockless components such that last lockless component of the three or more lockless components is directly pointing to first lockless component of the three or more lockless components;
providing one or more write pointers to configure two or more data producers to write to the same lockless component;
providing one or more read pointers to configure one or more data consumers to read from each of the three or more lockless components, the two or more data producers being able to write to the LLSB concurrently with the one or more data consumers being able to read from the LLSB; and
moving in response to at least one operation that is performed, one or more of a write pointer and a read pointer based on a state of one or more of the three or more lockless components.

19. A system for enabling data transfer between data producers and data consumers, the system comprising:
one or more processors; and
a computer-readable medium coupled to the one or more processors having instructions stored thereon which, when executed by the one or more processors, cause the one or more processors to perform operations for enabling data transfer between data producers and data consumers, operations comprising:
generating a data structure, the data structure comprising a lockless spin buffer (LLSB), the LLSB comprising three or more lockless components, each of the three or more lockless components comprising a plurality of elements to be written to and read from, and the three or more lockless components being cycled for write operations and read operations within the LLSB by circularly traversing each of the three or more lockless components such that last lockless component of the three or more lockless components is directly pointing to first lockless component of the three or more lockless components;
providing one or more write pointers to configure two or more data producers to write to the same lockless component;
providing one or more read pointers to configure one or more data consumers to read from each of the three or more lockless components, the two or more data producers being able to write to the LLSB concurrently with the one or more data consumers being able to read from the LLSB; and
moving in response to at least one operation that is performed, one or more of a write pointer and a read pointer based on a state of one or more of the three or more lockless components.

\* \* \* \* \*